(12) United States Patent
Goetz et al.

(10) Patent No.: US 8,813,049 B2
(45) Date of Patent: Aug. 19, 2014

(54) TYPE INFERENCE OF PARTIALLY-SPECIFIED PARAMETERIZED TYPES

(75) Inventors: Brian Goetz, Williston, VT (US); Alexander R. Buckley, Cupertino, CA (US); Joseph D. Darcy, Mountain View, CA (US); Maurizio Cimadamore, Malahide (IE)

(73) Assignee: Oracle International Corporation, Redwood City, CA (US)

( * ) Notice: Subject to any disclaimer, the term of this patent is extended or adjusted under 35 U.S.C. 154(b) by 920 days.

(21) Appl. No.: 12/827,871

(22) Filed: Jun. 30, 2010

(65) Prior Publication Data

US 2012/0005660 A1  Jan. 5, 2012

(51) Int. Cl.
G06F 9/44 (2006.01)
G06F 9/45 (2006.01)

(52) U.S. Cl.
USPC ........... 717/140; 717/114; 717/116; 717/141; 717/151

(58) Field of Classification Search
None
See application file for complete search history.

(56) References Cited

U.S. PATENT DOCUMENTS

| | | | |
|---|---|---|---|
| 7,669,184 B2* | 2/2010 | Bracha et al. | 717/116 |
| 7,735,070 B2* | 6/2010 | von der Ahe et al. | 717/140 |
| 7,810,077 B2* | 10/2010 | Bracha | 717/131 |
| 7,913,241 B2* | 3/2011 | Liu et al. | 717/151 |
| 2003/0028864 A1* | 2/2003 | Bowen | 717/141 |
| 2004/0139422 A1* | 7/2004 | Vion-Dury | 717/114 |
| 2006/0048095 A1* | 3/2006 | Meijer et al. | 717/114 |
| 2007/0044083 A1* | 2/2007 | Meijer et al. | 717/151 |
| 2007/0079285 A1* | 4/2007 | Cook et al. | 717/113 |
| 2007/0245325 A1* | 10/2007 | Lapounov et al. | 717/140 |
| 2007/0256060 A1* | 11/2007 | Ryu et al. | 717/140 |
| 2011/0314459 A1* | 12/2011 | Husbands | 717/151 |

OTHER PUBLICATIONS

Ford, N., Java generics support in Eclipse V3.1, IBM developerWorks, Oct. 18, 2005, 8 pages, [retrieved on Jan. 7, 2013], Retrieved from the Internet: <URL:http://www.ibm.com/developerworks/opensource/library/os-ecljgs/>.*

Manson, J., Proposal: Improved Type Inference for Generic Instance Creation, Mar. 13, 2009, 5 pages, [retrieved on Jan. 7, 2013], Retrieved from the Internet: <URL:http://web.archive.org/web/20090313105333/http://mail.openjdk.java.net/pipermail/coin-dev/2009-February/000009.html/>.*

(Continued)

*Primary Examiner* — Thuy Dao
*Assistant Examiner* — Geoffrey St Leger
(74) *Attorney, Agent, or Firm* — Robert C. Kowert; Meyertons, Hood, Kivlin, Kowert & Goetzel, P.C.

(57) ABSTRACT

A compiler receives source code for a program and determines that the code includes a declaration expression and an initialization expression in an assignment context. The declaration expression introduces a variable and specifies part of a parameterized type for the variable but not another part of the parameterized type. A parameterized type may include a ground type part and one or more type arguments; in a declaration expression, the specified part of the parameterized type may include a ground type and the unspecified part may include one or more of the type arguments. The initialization expression specifies an initial value for the variable, where the value has a parameterized type. The assignment context associates the declared variable with the initial value. The compiler infers the type for the variable based at least on the part specified in the declaration expression and on the type specified by the initialization expression.

17 Claims, 7 Drawing Sheets

(56) References Cited

OTHER PUBLICATIONS

Gafter, N., Constructor Type Inference, Neal Gafter's blog, Jul. 8, 2007, 7 pages, [retrieved on Jul. 26, 2013], Retrieved from the Internet: <URL:http://web.archive.org/web/20070708222450/http://gafter.blogspot.com/2007/07/constructor-type-inference.html>.*

Fuhrer, R., et al., Efficiently Refactoring Java Applications to Use Generic Libraries, ECOOP 2005—Object-Oriented Programming, 19th European Conference, Jul. 27-29, 2005, pp. 71-96, [retrieved on Jun. 4, 2013], Retrieved from the Internet: <URL:http://groups.csail.mit.edu/pag/pubs/genericlibs-tip-ecoop2005-abstract.html>.*

Auerbach, J., et al., Lime: a Java-Compatible and Synthesizable Language for Heterogeneous Architectures, Proceedings of the ACM international conference on Object oriented programming systems languages and applications, 2010, pp. 89-108, [retrieved on Mar. 21, 2014], Retrieved from the Internet: <URL:http://dl.acm.org/>.*

Gilad Bracha, "Generics in the Java Programming Language," Jul. 5, 2004, 23 pages.

Karlsruhe, "io-port.net Database," 1 page, 2000, downloaded from www.zentralblatt-math.org/ioport/en/?id=1347488&type=pdf.

Palsberg, et al., "Safety Analysis Versus Type Inference for Partial Types," Information Processing Letters 43 (1992) pp. 175-180.

Dexter Kozen, Jens Palsberg, Michael I. Schwartzbach. Efficient inference of partial types. Journal of Computer and System Sciences, 49(2):306-324, 1994. Preliminary version in Proceedings of FOCS'92, 33rd IEEE Symposium on Foundations of Computer Science, pp. 363-371, Pittsburgh, Pennsylvania, Oct. 1992.

Jens Palsberg and Michael I. Schwartzbach. Object-oriented type inference. In Proceedings of OOPSLA'91, ACM SIGPLAN Sixth Annual Conference on Object-Oriented Programming Systems, Languages and Applications, pp. 146-161, Phoenix, Arizona, Oct. 1991.

Nicholas Oxhoj, Jens Palsberg, and Michael I. Schwartzbach. Making type inference practical. In Proceedings of ECOOP'92, Sixth European Conference on Object-Oriented Programming, pp. 329-349. Springer-Verlag (LNCS 615), Utrecht, The Netherlands, Jul. 1992.

Jens Palsberg. Efficient inference of object types. Information and Computation, 123(2):198-209, 1995. Preliminary version in Proceedings of LICS'94, Ninth Annual IEEE Symposium on Logic in Computer Science, pp. 186-195, Paris, France, Jul. 1994.

Jens Palsberg, Mitchell Wand, and Patrick M. O'Keefe. Type inference with non-structural subtyping. Formal Aspects of Computing, 9:49-67, 1997.

Ole Agesen, Jens Palsberg, and Michael I. Schwartzbach. Type inference of Self: Analysis of objects with dynamic and multiple inheritance. Software—Practice & Experience, 25(9):975-995, Sep. 1995. Preliminary version in Proceedings of ECOOP'93, Seventh European Conference on Object-Oriented Programming, Springer-Verlag (LNCS 707), pp. 247-267, Kaiserslautern, Germany, Jul. 1993.

* cited by examiner

TYPE INFERENCE OF PARTIALLY-SPECIFIED PARAMETERIZED TYPES

BACKGROUND

Object-oriented computer programming languages, such as Java™, allow programmers to define software applications as a collection of "objects" of different types. Objects of a given type may be defined to include common data structures and/or to expose common functionality.

Some programming languages, such as Java™, allow programmers to define generic types, in addition to traditional nominal types. A generic type definition includes a declaration comprising: an identifier (i.e. ground type) and one or more formal type parameters. The formal type parameters may be utilized as type names in many contexts throughout the generic type definition.

For example, consider the Java™ generic type definition: public class List<X>{public X getNext( ){ . . . }}.

In this example, the generic type List<X> (pronounced "List of X") includes the ground type List and the formal type parameter X. The variable X may therefore be used in the generic type definition wherever a type is needed. For example, the generic method "public X getNext( )" returns a value of type X. Since X is a type parameter, not an actual type, its scope is limited to the generic type definition of List<X>. A programmer may use the generic type List<X> by declaring a variable of type List and supplying a type argument to substitute for type parameter X. For instance, the programmer may declare a variable of type List<String> (i.e., a "List of Strings") or a List<Integer> (i.e., a "List of Integers").

When a type argument is supplied for a type parameter of a generic type, the resulting type (e.g. List<String>) may be referred to herein as a parameterized type. Thus, a parameterized type indicates both a ground type (e.g. List) and type arguments for all type parameters (e.g. String for X). The members of a parameterized type are the members of the generic type with the parameterized type's type arguments substituted for the generic type's type parameters. For example, the parameterized type List<String> has a method 'public String getNext( )' because the generic type has a method 'public X getNext( )'.

Thus, generic types may reduce code duplication (because a single generic type List<X> is possible rather than a type StringList with 'public String getNext( )', a type IntegerList with 'public Integer getNext( )', etc), while parameterized types may increase type safety (because the caller of getNext( ) on List<String> may receive a String rather than a general type like Object which a non-generic List would typically return and which would typically have to be cast to a more useful type).

One shortcoming of parameterized types is that they may be verbose to use. For example, some languages require that parameterized types be specified both in a variable declaration (e.g., "List<String> varname") and in an object creation (e.g., "new List<String>( );"). Some generic types may require multiple type arguments, any of which may be parameterized types themselves. Therefore, traditional parameterized type notations may quickly become verbose and/or otherwise cumbersome for the programmer, resulting in decreased productivity and making application code less readable.

SUMMARY

A system and method is disclosed for compiler inference of variable types based on partial specification of those types. The compiler is configured to receive source code for a program and to determine that the code includes a declaration expression and an initialization expression in an assignment context. The declaration expression introduces a variable and specifies part of a parameterized type for the variable but not another part of the parameterized type. A parameterized type may include a ground type part and one or more type arguments; in a declaration expression, the specified part of the parameterized type may include a ground type and the unspecified part may include one or more of the type arguments. The initialization expression specifies an initial value for the variable, where the value has a parameterized type. The assignment context associates the declared variable with the initial value. The compiler infers the type for the variable based at least on the part specified in the declaration expression and on the type specified by the initialization expression.

The compiler binds the variable to the inferred type and compiles the source code. The compiling is dependent on the binding of the variable to the inferred type. In some embodiments, the ground type specified in the declaration may or may not match the ground type specified in the initialization expression.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must).

Similarly, the words "include", "including", and "includes" mean including, but not limited to.

DETAILED DESCRIPTION OF EMBODIMENTS

Programming languages such as Java™ allow programmers to define generic and parameterized types. As used herein, the term generic type refers to a type identified by a combination of an identifier (i.e., a ground type) and one or more formal type parameters. The generic type definition utilizes the formal type parameters as variables in the type definition where nominal types may normally be used.

As used herein, the term parameterized type refers to a type that corresponds to a given generic type (e.g., shares the same ground type and number/type of type parameters), but supplies a respective type argument for each formal type parameter of the corresponding generic type. Thus, a parameterized type uses a supplied type argument wherever the corresponding generic type uses the respective formal type parameter.

For example, consider the following two lines of Java code:

```
(1) public class Tree<T> { T getRoot(...) }
(2) Tree<String> myTree = new Tree<String>( );
```

Line (1) of the example above defines a generic class Tree<T>. The class includes the formal type parameter T, which may be used in the definition of the Tree<T> class in many contexts where a nominal type can be used. For example, the GetRoot( ) method of line (1) returns an object of type T.

A programmer can create a parameterized type by supplying a type argument for the type parameter T. For example, a programmer may declare a "Tree of Strings", as on the left-hand side of the assignment expression in (2), by supplying the value String for the type parameter T. The code on the right-hand side of the assignment expression initializes an object of type "Tree of Strings".

In the code example above, line (2) includes the parameterized type "Tree<String>" on both sides of the assignment expression. That is, the full parameterized type appears in both the variable declaration expression on the left-hand side of the assignment expression ("Tree<String> myTree") and in the initialization expression on the right-hand side of the assignment expression ("new Tree<String>( );"). However, it may be redundant and/or slow for the programmer to replicate this full parameterized type specification in both the declaration and initialization expressions of the assignment expression, particularly when using more complex parameterized types (e.g., "Tree<List<List<String>>> myTree=new Tree<List<List<String>>>( );").

According to various embodiments, a programmer may use a shorthand expression in a declaration expression of an assignment context (e.g., left-hand side of an assignment expression) to request that a compiler infer a parameterized type for the declared variable from an initialization expression in that context (e.g., right-hand side of an assignment expression). Thus, the resulting computer code may become less verbose and/or less confusing than a version where the full type argument is specified for both the declaration and initialization expressions.

Figure 1:
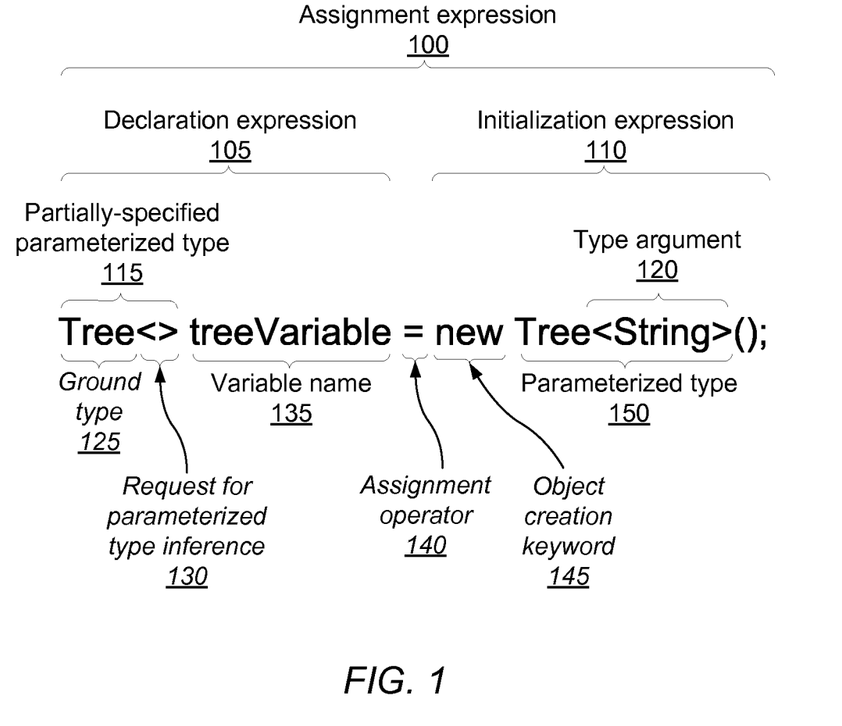
FIG. 1 illustrates an example of an assignment context including a declaration expression that requests parameterized type inference, according to some embodiments.

FIG. 1 illustrates an example of an assignment context including a declaration expression that requests parameterized type inference, according to some embodiments. The code examples used herein, including assignment expression 100 of FIG. 1, are illustrated using Java™ syntax. However, one of ordinary skill in the art having benefit of this disclosure will understand that the techniques described herein are applicable to many different current and future programming languages.

According to the illustrated embodiment, assignment expression 100 includes an assignment operator 140 ("=") with a declaration expression 105 (Tree<>treeVariable) on its left-hand side and an initialization expression 110 (new Tree<String>( );) on its right-hand side. As used herein, the terms declaration and initialization of an assignment context refer respectively to the expression in the assignment context that declares a given variable (i.e., the declaration) and the expression that evaluates to the initial value to be assigned to that variable (i.e., the initialization). In various embodiments, assignment contexts (including declaration, initialization, and/or assignment operators) may be expressed using various syntax, depending on the programming language. Type inference may occur in any assignment context, not just at an assignment expression. For example, assignment may occur without any "=" operator at a method call, where actual arguments are assigned to the method's formal parameters.

In the illustrated embodiment, initialization expression 110 specifies an initial value that has parameterized type 150 (Tree<String>). As discussed, above, the parameterized type 150 includes a specified ground type 125 (Tree) and a specified type argument 120 (<String>). Initialization expression 110 also includes object creation keyword 145 (new) instructing the program to create a new object of parameterized type to serve as the initial value. In various embodiments, an initialization expression may specify an initial value indirectly by calling a method, dereferencing a field, accessing an array, or other means provided by a programming language to obtain a value of parameterized type.

According to the illustrated embodiment, declaration expression 105 declares a variable named treeVariable using variable name 135 and a partially-specified parameterized type 115. Partially specified parameterized type 115 includes the ground type 125 of the Tree<T> generic type. However, the partially-specified parameterized type excludes an argument for the formal type parameter of the generic type. Instead, partially-specified parameterized type 115 includes a short-hand expression 130 requesting that the compiler infer the missing type argument. That is, instead of specifying the type argument in the declaration expression 105, the programmer uses request 130 to indicate to the compiler that the compiler should infer the missing type argument from other elements of the assignment context, such as initialization expression 110 and/or ground type 125. Thus, using the short-hand of 130, the programmer may save time and effort over traditional techniques that require the parameterized type to be fully specified in both the declaration and initialization expressions of the assignment context.

In various embodiments, depending on the particular programming language used, various other syntaxes may express an assignment, including using a declaration expression, initialization expression, and/or assignment operator other than those shown in 105, 110, and 140. In addition, various other shorthand notations other than the diamond-shaped expression of 130 may be used to request parameterized type inference.

As disclosed herein, the concept of a partially-specified parameterized type notation, such as 115 which specifies a ground type portion of the parameterized type but excludes a type argument, is contrasted with that of fully-specified type notation (e.g., Tree<String> treeVariable) and that of an unspecified type notation (e.g., var treeVariable). Partially-specified parameterized type notation is less verbose than fully-specified parameterized type notation, but does specify at least some portion of the type. For example, in some situations, a programmer may use partially-specified parameterized type notation to supply at least enough of the type to enable a compiler to infer the remaining unspecified portion exactly. In some embodiments, the partially-specified parameterized type may exclude all type arguments (e.g., "Tree< >") or specify just a subset (but not all) of the type arguments. For example, given the generic class definition "class BinaryTree<T,U>", a programmer may declare a partially-specified parameterized type "BinaryTree<,String>". By omitting the first type argument but not the second, the programmer may request that the compiler infer the first type argument but not the second.

In contrast, unspecified type notation may not always provide the compiler with enough information to infer the exact intended type of a variable. For example, consider the unspecified type expression "var treeVariable=new Tree<String>( );". If the generic class Tree<X> implements multiple interfaces, the compiler cannot generally infer that the type of treeVariable should be a specific one of these interfaces. Instead, the compiler can only infer that treeVariable is of type Tree<String>. In contrast, partially-specified parameterized type notation allows the programmer to specify some of the type (e.g., the ground type Tree) while allowing a compiler to definitively infer the full type from the partial specification and other elements, such as an initialization expression, as described in more detail below.

Figure 2:
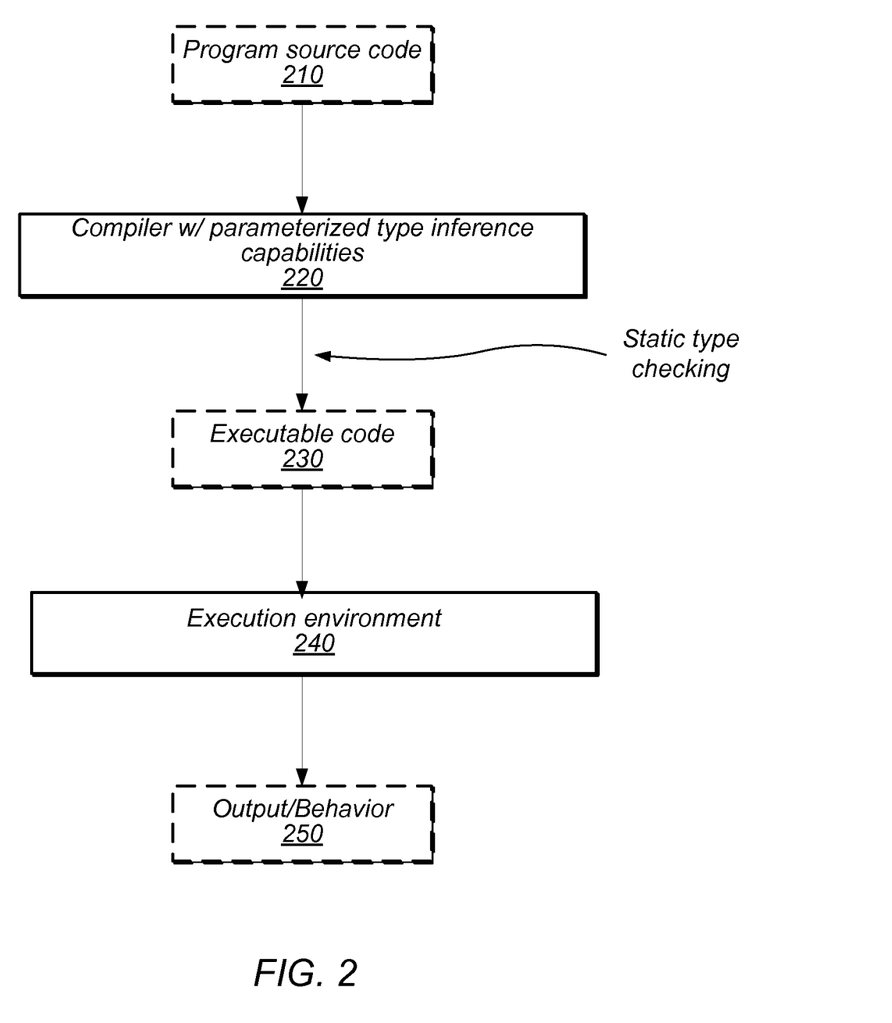
FIG. 2 illustrates a workflow for compiling and executing a computer program specified in a high-level language using partially-specified parameterized types, according to various embodiments.

FIG. 2 illustrates a workflow for compiling and executing a computer program specified in a high-level language using partially-specified parameterized types, according to various embodiments. In FIG. 2, solid outlines indicate operational components 220 and 240 while dashed outlines (e.g., 210, 230, and 250) indicate data passed between these components.

According to the illustrated embodiment, the workflow begins when a compiler with parameterized type inference capabilities, such as 220, receives source code for a computer program, such as 210. In various embodiments, source code 210 may be specified in various high-level and/or object-oriented programming languages, such as Java™ and/or other languages. In some embodiments, source code 210 may be specified using a combination of languages, which may include one or more low-level and/or intermediate languages (e.g., assembly). The embodiments disclosed herein are described in terms of Java™ programs, though as noted above, various other languages may be used.

According to the illustrated embodiment, compiler 220 may compile source code 210 into an executable version, such as 230. In various embodiments, executable code 230 may be encoded in a byte-code, binary machine language, and/or in other various executable formats. In some instances, parts of the executable code 230 may be in byte-code while others are in a native binary machine language.

As part of compiling program source code 210 into executable code 230, compiler 220 may perform some static type checking, which may include static type inference and binding of partially-specified parameterized types, as discussed herein.

As illustrated in FIG. 2, executable code 230 may be passed to an execution environment, such as 240, which executes the code, thereby creating various output data and/or behavior 250. In various embodiments, execution environment 240 may include a physical computer system, a virtual machine (e.g., Java™ Virtual Machine), a software environment (e.g., container, web browser, etc.), support libraries, and/or various other components usable to execute code 230, either directly or by interpretation.

In different circumstances, output/behavior 250 may include data stored in various levels of system memory (e.g., in-memory objects and/or data structures), on persistent storage (e.g., files on a file system), etc. Behavior 250 may also include various program functionalities, such as displaying output on a screen, sending messages over a network, and/or otherwise interacting with various users and/or components.

Figure 3:
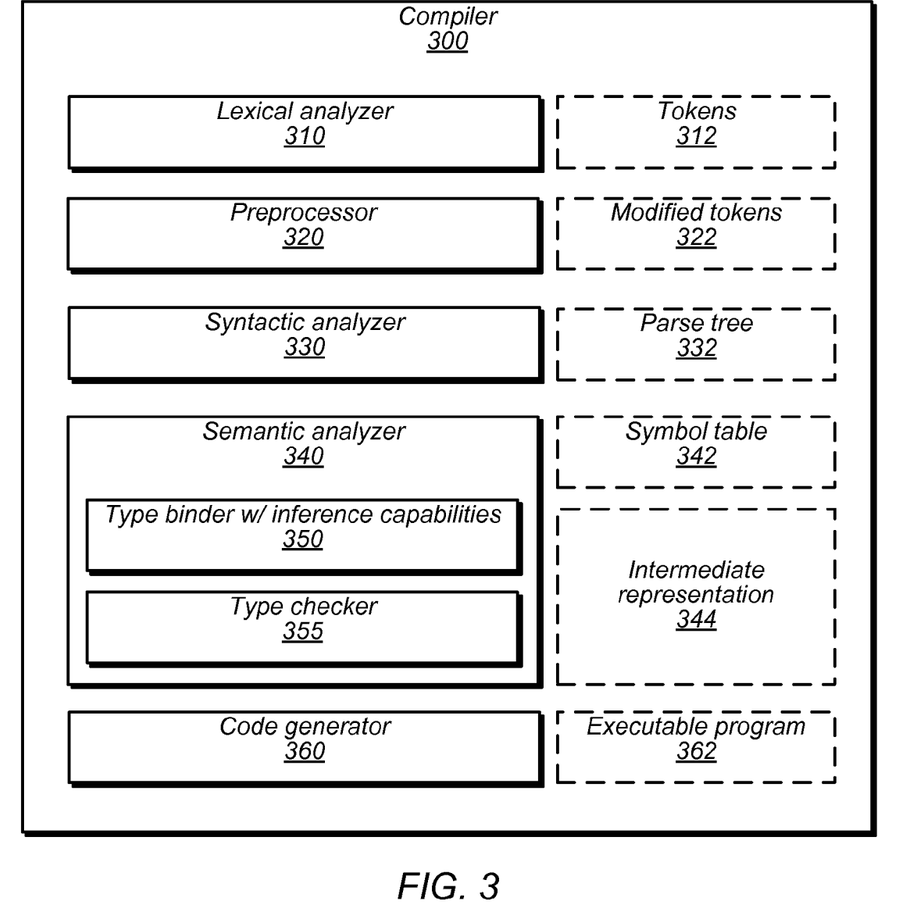
FIG. 3 is a block diagram illustrating the components of a compiler configured to perform type inference from partially-specified parameterized type notation, according to various embodiments.

FIG. 3 is a block diagram illustrating the components of a compiler configured to perform type inference from partially-specified parameterized type notation, according to various embodiments. According to various embodiments, the compiler may be implemented in software and executed by a computer system on given source code, such as source code 210. As in FIG. 2, solid outlines in FIG. 3 indicate functional components while dashed lines indicate data structures passed among the functional components.

According to the illustrated embodiment, compiler 300 includes lexical analyzer 310, which may be configured to break the input source code into tokens, such as tokens 312. Each token 312 may correspond to a single atomic unit of the given language, such as keywords, identifiers, etc. In various embodiments, the token syntax may be represented as a regular language.

According to the illustrated embodiment, compiler 300 may include preprocessor 320, which may be used to support macro substitution in some languages. In some embodiments, preprocessor 320 may modify various ones of tokens 312, which may result in a set of modified tokens, such as 322.

Compiler 300 also includes syntactic analyzer 330, which may be configured to parse the modified tokens 322 to identify syntactic structure of the input program. The syntactic analyzer may be configured to build a parse tree, such as parse tree 332, which may organize the tokens of 322 into a tree structure according to the formal grammar of the programming language of the source code.

Compiler 300 further includes a semantic analyzer 340, which may be configured to add semantic information to parse tree 332 to create an annotated internal representation of the program, such as intermediate representation 344. In some embodiments, a code generator, such as code generator 360, may convert the intermediate representation 344 into an executable program, such as 362. Executable program 362 may be encoded in binary and/or byte code and may correspond to executable code 230 in FIG. 2.

In some embodiments, semantic analyzer 340 may also build and/or maintain a symbol table, such as symbol table 342, which maps various symbols in the source code to associated information, such as the location, scope, and/or type. Accordingly, semantic analyzer 340 may include various type binding mechanisms for binding variables to their respective type, such as type binder 350. In various embodiments, type binder 350 may be configured to detect symbols with partially-specified parameterized type definitions in a declaration and to infer a corresponding type for the variable from the partial specification and from an initialization expression, as described herein.

In some embodiments, the semantic analyzer 340 may also include a type checker, such as type checker 355, to perform type-checking functions. That is, to detect type compatibility errors in the code. In some embodiments, if type checker 355 determines that the code includes an incorrect type mapping, it may generate an error or warning message during compilation. In some instances, such errors or warnings may cause the compilation to fail.

In various embodiments, different components of compiler 300 may be combined or further deconstructed into multiple components. Various functionality may be performed by different components without limitation and the compiler may implement various additional compilation functionality, such as optimization, line reconstruction, and/or other functionality known in the art.

Figure 4:
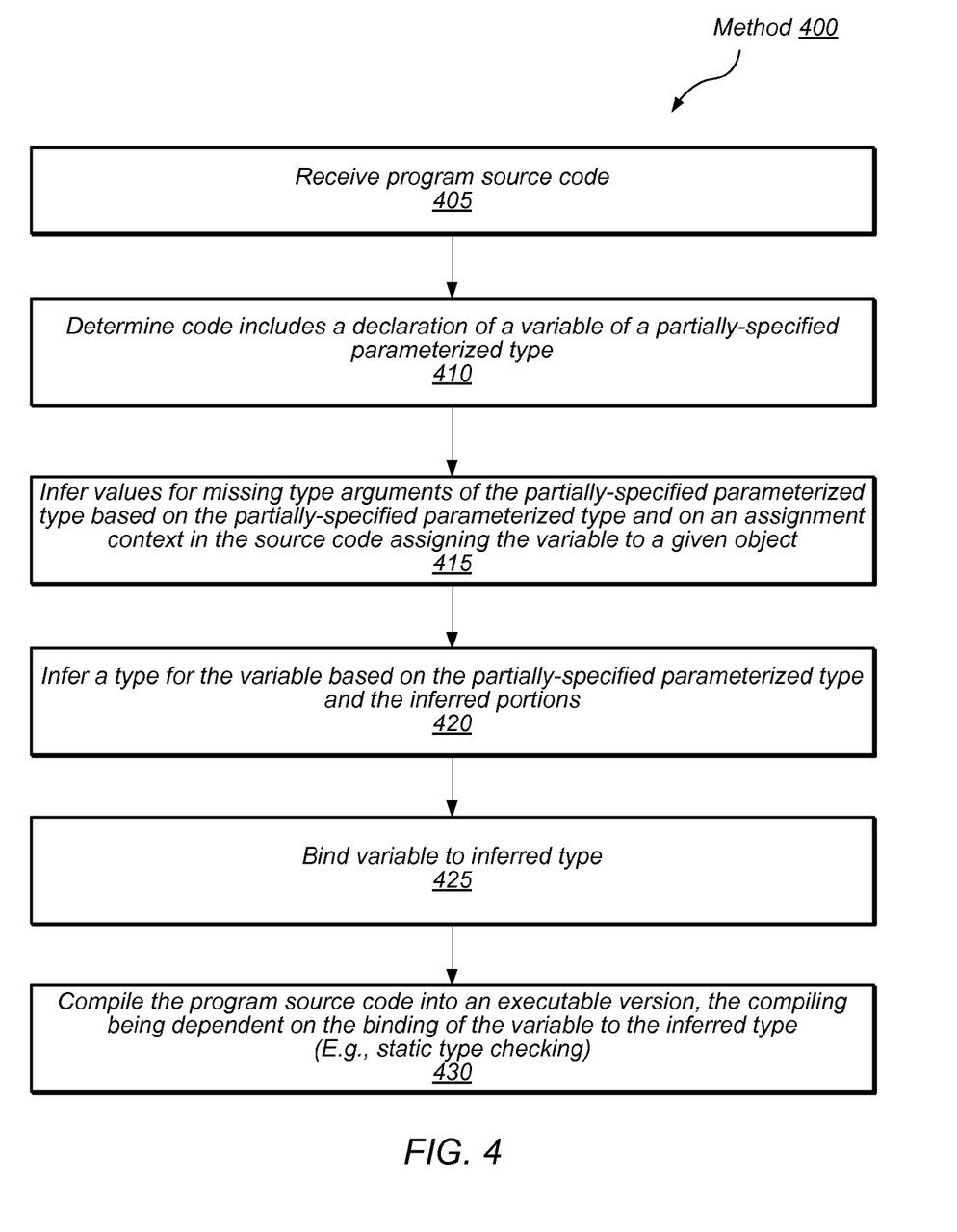
FIG. 4 is a flow diagram illustrating a method performing type inference using a partially-specified parameterized type, according to various embodiments.

FIG. 4 is a flow diagram illustrating a method performing type inference using a partially-specified parameterized type, according to various embodiments. In some embodiments, method 400 of FIG. 4 may be executed by a compiler, such as compiler 300 of FIG. 3.

According to the illustrated embodiment, method 400 begins when the compiler receives a program source code, as in 405. In some embodiments, the source code may be provided in one or more files and may be specified in one or more high-level and/or object-oriented programming languages, such as Java™.

In 410, the compiler may determine that the source code of 405 includes a declaration expression that declares a variable of a partially-specified parameterized type. For example, in 410, the compiler may detect a declaration expression, such as declaration expression 105 of FIG. 1, which includes the partially-specified parameterized type (Tree< >). In some embodiments, the partially-specified parameterized type in the declaration expression may indicate one or more portions of the type (e.g., ground type 125) and omit at least another portion (e.g., respective values for one or more type arguments).

In 415, the compiler may infer values for the one or more missing type arguments of the partially-specified parameterized type. This type inference may be made based on the specified portions of the partially-specified parameterized type and on an assignment context in the source code that assigns the variable to a given variable. Using the partially-specified parameterized type and the inferred type arguments, the compiler may infer a type for the variable, as in 420, as if the declaration expression had given a fully-specified parameterized type for the variable.

According to the illustrated embodiment, the compiler may then bind the variable to the inferred type, as in 425, and compile the source code into an executable version, as in 430. As indicated in 430, the compilation may be dependent on the binding of the variable to the inferred type. For example, the compiler may be configured to perform a static type-checking process that ensures that each use of the variable is in accordance with the bound type and to provide an error and/or warning message if this is not the case.

Figure 5:
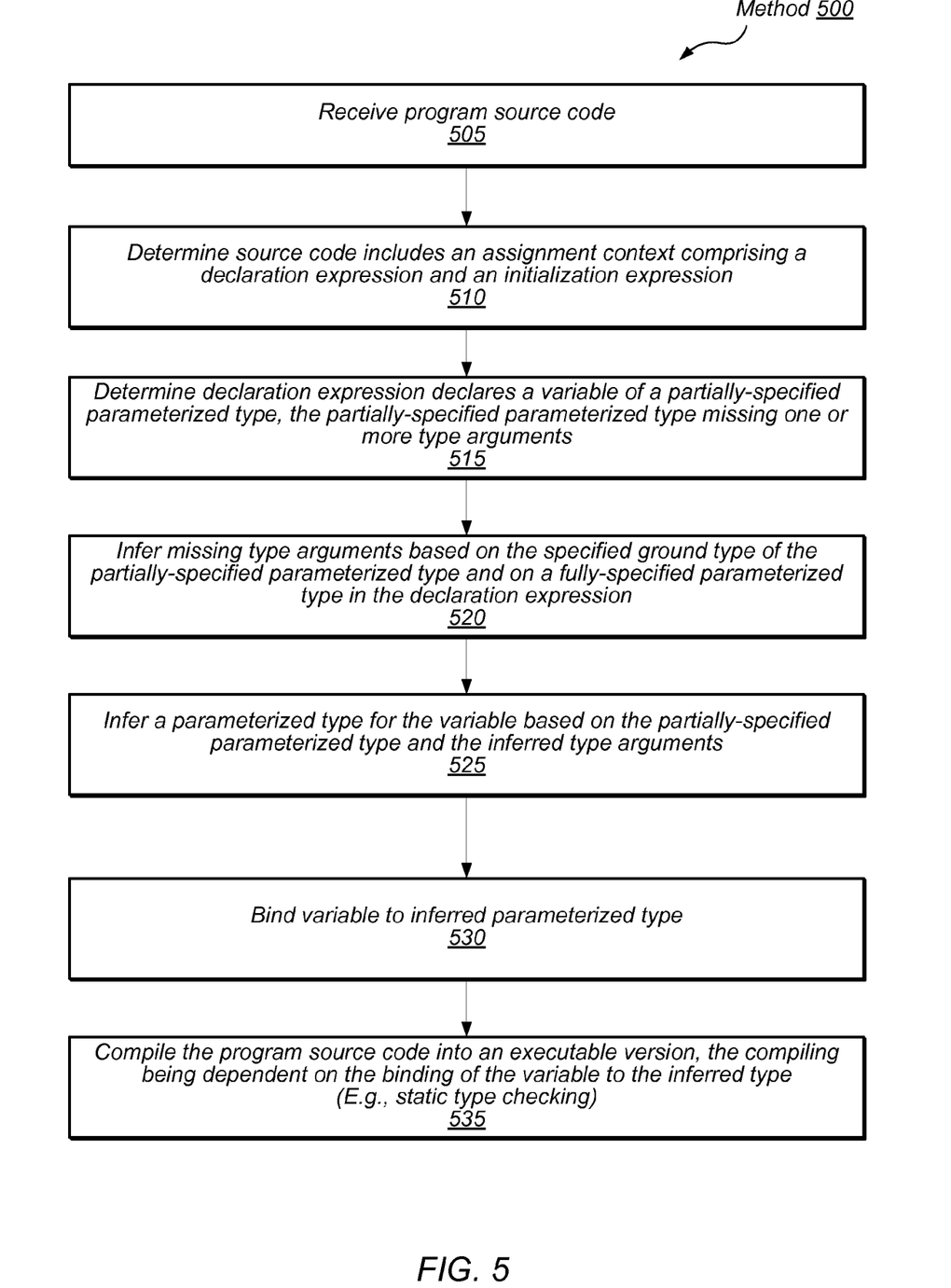
FIG. 5 is a flow diagram illustrating a method performing parameterized type inference using a partially-specified parameterized type, according to some embodiments.

FIG. 5 is a flow diagram illustrating a method performing parameterized type inference using a partially-specified parameterized type, according to some embodiments. In some embodiments, method 500 of FIG. 5 may be executed by a compiler, such as compiler 300 of FIG. 3. Method 500 may be considered one embodiment of an implementation of method 400, where the partially-specified parameterized type corresponds to a partially-specified parameterized type, and the assignment context includes both the declaration and initialization expressions.

According to the illustrated embodiment, method 500 begins when the compiler receives program source code, as in 505. Step 505 may correspond to step 405 of method 400. Next, the compiler may determine that the source code includes an assignment context comprising a declaration expression and an initialization expression as in 510 For example, in 510, the compiler may determine that the source code includes an initialization expression such as initialization expression 100, including a declaration expression such as 105 and an initialization expression such as 110.

In 515, the compiler determines that he declaration expression declares a variable of a partially-specified parameterized type. For example, the partially-specified parameterized type (e.g., 115) may specify a ground portion (e.g., 125) but be missing type arguments for one or more type parameters. In some embodiments, the partially-specified parameterized type may include an indication that type inference is requested from the compiler. The diamond-shaped request 130 of FIG. 1 is one example of such notation. In various embodiments, other notations may be used to indicate the inference request to the compiler.

Figure 6:
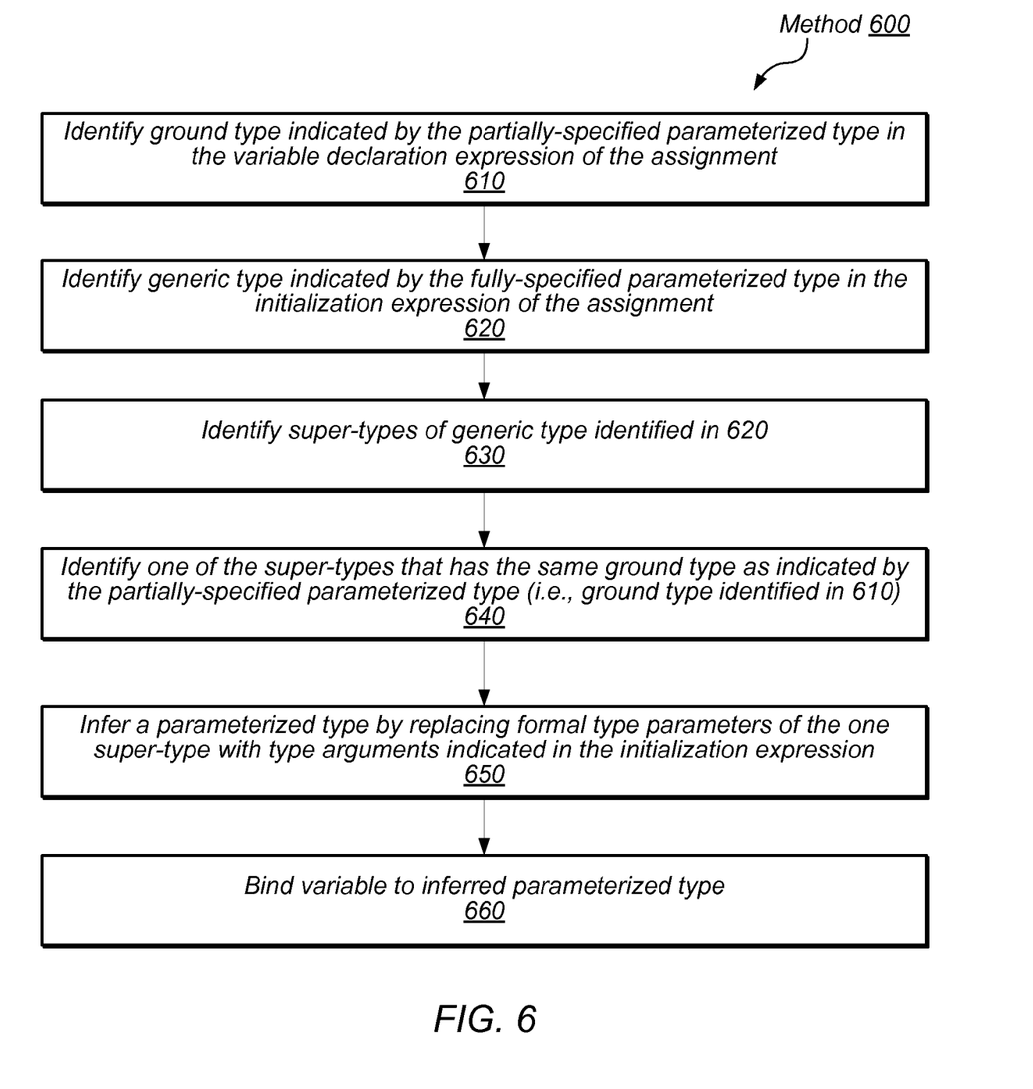
FIG. 6 illustrates an example of one embodiment of a method for performing this inference and is discussed in more detail below.

In response to detecting the request in the declaration, the compiler may infer the missing type argument(s), as in 520. In some embodiments, the compiler may infer these values in 520 based on the ground type indicated by the partially-specified parameterized type and on a fully specified parameterized type in the initialization expression. For example, with regard to FIG. 1, the compiler may infer the missing type arguments of expression 115 based on ground type 125 and parameterized type 150. FIG. 6 illustrates an example of one embodiment of a method for performing this inference and is discussed in more detail below.

According to method 500, the compiler may then infer the parameterized type, as in 525. For example, the compiler may infer the parameterized type by parameterizing the partially-specified parameterized type of the declaration with the type arguments the compiler inferred in 520.

Once the compiler has inferred a parameterized type for the variable, as in 520, it may bind the variable to the inferred parameterized type, as in 530. For example, the compiler may update a symbol table, such as symbol table 342 of compiler 300, to reflect that the variable is of the inferred parameterized type.

In 535, the compiler may compile the source code into an executable version. As indicated in 535, the compilation may be dependent on the binding of the variable to the inferred type, for example, due to a static type-checking process performed by the compiler.

In some situations, type inference may not be as straightforward as copying type arguments from an initialization to a declaration expression. For example, consider the following Java™ code:

(3) public interface InterfaceA<T> {...}
(4) public class ClassA<X> implements InterfaceA<List<List<X>>>{...}
(5) InterfaceA<List<List<String>>>var = new ClassA<String>( );
(6) InterfaceA<> var2 = new ClassA<String>( );

The declaration of line (3) defines a generic interface named InterfaceA<T> that accepts a formal type parameter T. Line (4) defines a generic class ClassA that implements InterfaceA<List<List<X>>>. Line (5) is an assignment expression that uses a traditional syntax to declare a variable named var, of type InterfaceA<List<List<String>>>, and to assign that variable to a new object of type ClassA<String>. Since ClassA<String> implements InterfaceA<List<List<String>>>, this is a valid assignment.

Line (6) of the above example is an example of an assignment expression, according to some embodiments, that declares a variable (var2) using a partially-specified parameterized type (InterfaceA< >). The partially-specified parameterized type includes a ground type (InterfaceA) and a shorthand request for type inference (< >) in place of one or more missing type arguments. In this example, the correct type of var2, given the partial specification, is InterfaceA<List<List<String>>>. However, a compiler may not be able to correctly infer that this is the correct type by simply copying over type arguments from the initialization expression on the right-hand side of the assignment expression in (6) to the declaration expression because InterfaceA<String> is not a supertype of ClassA<String>. Instead, a type inference algorithm such as that described herein may be required to infer the correct type.

Furthermore, simply copying type arguments may not be possible because type arguments in the initialization expression may be re-ordered or omitted in the declaration expression due to subtyping. Consider the following example:

```
Class FastBinaryTree<T,U,V> extends Binary Tree<U,T>{...}
BinaryTree<> b = new FastBinaryTree<String, Integer, Double>( );
```

In the above case, the correct type inference for b would be BinaryTree<Integer,String>. However, naively copying type arguments String, Integer, and Double from the initialization expression into the partially-specified parameterized type of the declaration expression would result in a) the wrong number of type arguments to BinaryTree, and b) an incorrect invocation of BinaryTree with respect to its subtype FastBinaryTree (since the first type argument to FastBinaryTree should become the second type argument of BinaryTree, and the second type argument of FastBinaryTree should become the first type argument of BinaryTree, as per the generic type signature for class FastBinaryTree).

FIG. 6 illustrates a method for inferring a parameterized type corresponding to a partially-specified parameterized type in a declaration of an assignment context, according to some embodiments. In some embodiments, method 600 of FIG. 6 may be executed by a compiler to infer type arguments for partially-specified parameterized types, such as that on the left-hand side of the assignment expression of line (6) above, and/or may correspond to steps 520-525 of method 500 illustrated in FIG. 5.

According to the illustrated embodiment, the compiler may begin by identifying the ground type of the partially-specified parameterized type of the variable that is declared in the declaration expression, as in 610. For example, for line (6) above, the partially specified parameterized type is InterfaceA<>, which indicates the ground type InterfaceA. Accordingly, in 610, a compiler may identify the ground type InterfaceA.

In 620, the compiler examines the initialization expression of the assignment to determine the generic type of the initial value. For example, using line (6) above, the compiler may examine the initialization expression on the right-hand side of the assignment (i.e., new ClassA<String>( );) to determine that the generic type of the initial value is ClassA<X>. In some embodiments, the compiler may compare the fully-specified type (e.g., ClassA<String>) with a set of known generic classes that have already been defined (e.g., in line (4) of the above example).

According to FIG. 6, the compiler may then identify one or more supertypes of the generic type identified in 620. In some embodiments, a supertype of the generic type may correspond to any class extended and/or interface implemented by the generic type, either directly or via inheritance from other supertypes of the generic type. In some embodiments, the compiler may consult various lookup structures (e.g., symbol table 342, parse tree 332, intermediate representation 344, etc.) to identifying the supertypes of the generic type identified in 620.

Continuing the example above, after having identified ClassA<X> as the generic type initialized in line (6), the compiler may identify the interface InterfaceA<List<List<X>>> as a supertype of the generic class ClassA<X>. This may be because ClassA<X> implements the interface InterfaceA<List<List<X>>>, as indicated in line (4). In some embodiments, the compiler may identify multiple supertypes, such as any number of interfaces implemented and/or classes extended by the generic type and/or its ancestors.

In 640, the compiler identifies one of the identified supertypes that has the same ground type as that indicated by the partially-specified parameterized type of the declaration expression (i.e., the ground type identified in 610). For example, in 640, the compiler may identify that the supertype InterfaceA<List<List<X>>>, which was identified in 630, has the same ground type (InterfaceA) as that indicated by the partially-specified parameterized type InterfaceA< >.

According to the illustrated embodiment, the compiler may then infer the correct parameterized type by replacing the formal type parameters of the supertype identified in 640 with corresponding type arguments from the fully-specified parameterized type of the initialization expression, as in 650. For example, after inferring the supertype InterfaceA<List<List<X>>> in 630, the compiler may replace the formal type parameter of this supertype (X) with the parameterized type argument (String) indicated by the fully-specified parameterized type (ClassA<String>) in the initialization expression (new ClassA<String>( );) of the assignment. Thus, by replacing the formal type parameter X with the parameterized type argument String, the compiler may infer the correct parameterized type InterfaceA<List<List<String>>>.

In 660, the compiler may bind the declared variable (e.g., var2) to the inferred parameterized type (e.g., InterfaceA<List<List<String>>>). In various embodiments, binding the variable to the parameterized type may comprise updating metadata, such as that in symbol table 342 and/or intermediate representation 344. When the compiler performs static type checking for the source code, the type checking may therefore depend on the declared variable having the inferred parameterized type. For example, if the declared variable is used in a manner inconsistent with the inferred parameterized type, then the compilation process may fail with an error message.

In some embodiments, instead of or in addition to the static type checking performed by the compiler, the runtime environment may be configured to perform dynamic type checking at runtime. That is, the runtime environment (e.g., execution environment 240) may be configured to check that variable are being used at runtime in manners consistent with their respective types (e.g., dynamic type-casts) and to throw various runtime errors (e.g., typecast exception) if the typing system is violated. For example, if the program attempts to typecast the variable to another supertype, which is not implemented or extended by the inferred parameterized type, then the runtime environment may throw a typecast exception to indicate that the cast is illegal.

Figure 7:
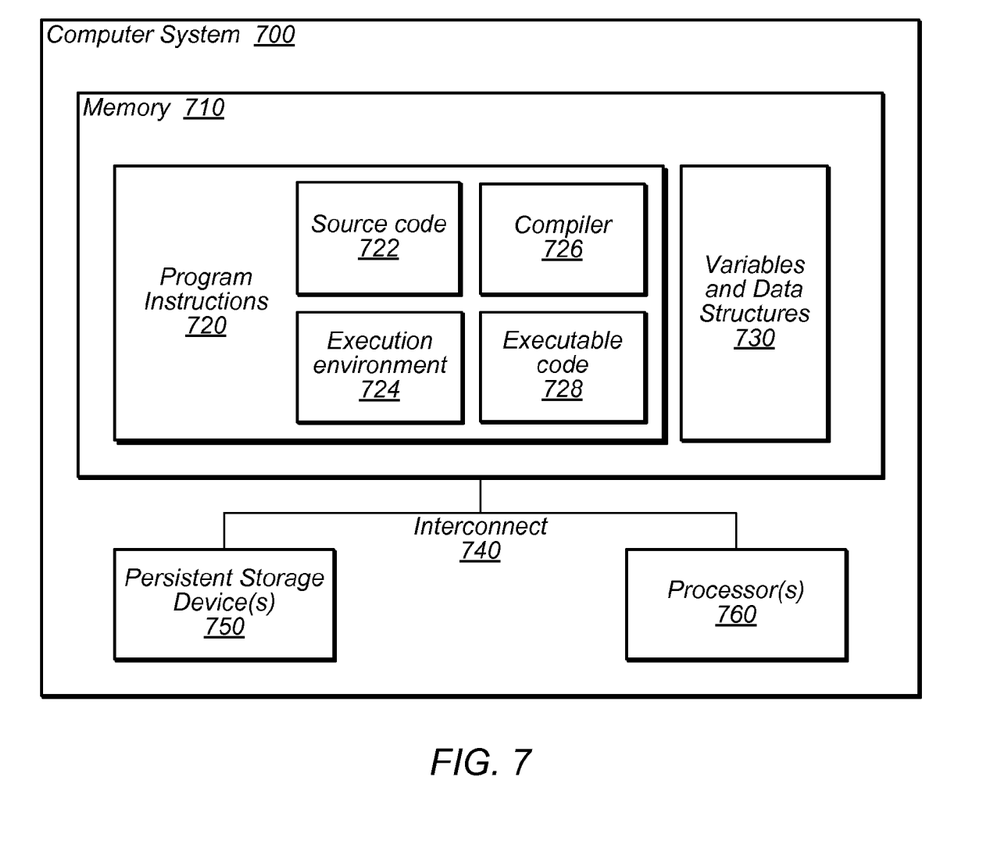
FIG. 7 is a block diagram illustrating a computer system configured to implement compilation with parameterized type inference as described herein, according to various embodiments.

FIG. 7 is a block diagram illustrating a computer system configured to implement compilation with parameterized type inference as described herein, according to various embodiments. The computer system 700 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The compiler components, source code, and/or code to execute various compilation methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 700 may include one or more processors 760, each of which may include multiple cores, any of which may be single or multi-threaded. The computer system 700 may also include one or more persistent storage devices 750 (e.g. optical storage, magnetic storage, hard drive, tape drive, solid state memory, etc), which may persistently store, for example, data such as program source code 210, executable code 230, and/or various outputs 230 as shown in FIG. 2.

According to the illustrated embodiment, computer system 700 may include one or more memories 710 (e.g., one or more of cache, SRAM, DRAM, RDRAM, EDO RAM, DDR 10 RAM, SDRAM, Rambus RAM, EEPROM, etc.). The one or more processors 760, the storage device(s) 750, and the system memory 710 may be coupled to an interconnect 740. Various embodiments may include fewer or additional components not illustrated in FIG. 7 (e.g., video cards, audio cards, additional network interfaces, peripheral devices, a network interface such as an ATM interface, an Ethernet interface, a Frame Relay interface, monitors, keyboards, speakers, etc.).

One or more of the system memories 710 may contain program instructions 720. Program instructions 720 may be encoded in platform native binary, any interpreted language such as Java™ byte-code, or in any other language such as C/C++, Java™, etc or in any combination thereof. Program instructions 720 may include various source code 722, for one or more applications, which may be compiled into executable code 728 by compiler 726. In various embodiments, source code 722 may include generic type definitions, parameterized types, and/or partially-specified parameterized types, as discussed herein.

In some embodiments, compiler 726 may correspond to compiler 300 of FIG. 3 and may be configured to infer parameterized types for variables declared using partially-specified parameterized types. In some embodiments, executable code 728 may correspond to executable code 230 of FIG. 2 and be encoded in an interpreted language, Java™ byte-code, a native binary language specific to computer system 700, and/or in various other executable language formats.

In some embodiments, program instructions 720 may further comprise one or more execution environment, such as 724, for executing executable code 728 on computer system 700. Execution environment 724 may correspond to execution environment 240 of FIG. 2 and may comprise various virtual machines, software containers, software libraries, interpreters, and/or other software infrastructure necessary for executing executable code 728. For example, in some embodiments, execution environment 724 may comprise one or more Java™ Virtual Machines for executing Java™ bytecode of executable code 728.

In some embodiments, memory 710 may include any number of in-memory variables and data structures, such as 730. Variables and data structures may comprise compiler data structures (e.g., tokens 312, modified tokens 322, parse tree 332, symbol table 342, intermediate representation 344, etc.), which may include indications of variables declared and/or objects initialized in source code 722. In some embodiments, variables and data structures 730 may include in-memory objects allocated by execution environment 724 in response to executing executable code 728. Such in-memory objects may include variables and/or data structures of different types, such as parameterized types.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A non-transitory computer-readable storage medium storing program instructions executable by a computer to implement a compiler, wherein the compiler is configured to:
receive source code for a computer program;
determine that the source code includes an assignment context associating a variable with a value, the assignment context having:
a declaration expression introducing the variable, wherein the declaration expression specifies a part of a type for the variable and does not specify another part of the type for the variable, wherein:
the type for the variable is a parameterized type;
the part of the type specified in the declaration expression comprises a ground type; and
the part of the type not specified in the declaration expression comprises one or more type arguments for the parameterized type; and
an initialization expression whose evaluation will result in the value, wherein a type of the initialization expression is a parameterized type corresponding to a given ground type and one or more type arguments;
infer the type for the variable based at least on the specified part of the type in the parameterized type in the declaration expression and on the parameterized type of the initialization expression, wherein to infer the type for the variable, the compiler is configured to:
identify a generic type corresponding to the parameterized type of the initialization expression;
identify a generic supertype of the identified generic type, wherein the identified generic supertype has the same ground type as a ground type indicated by the part of the type for the variable introduced in the declaration expression; and
infer a parameterized type for the variable by parameterizing the generic supertype with one or more type arguments of the parameterized type of the initialization expression;
in response to said inferring, bind the variable to the inferred type; and
compile the source code into an executable version of the computer program, wherein the compiling is dependent on the binding of the variable to the inferred type.

2. The non-transitory computer-readable storage medium of claim 1, wherein the given ground type for the declaration expression is different than the given ground type for the initialization expression.

3. The non-transitory computer-readable storage medium of claim 1, wherein the declaration expression includes an indication of a request for the compiler to infer the type for the variable.

4. The non-transitory computer-readable storage medium of claim 1, wherein the assignment context is an assignment expression that includes the declaration expression and the initialization expression.

5. The non-transitory computer-readable storage medium of claim 1, wherein the compiler is further configured to determine that the variable is being used within the source code in a manner inconsistent with the inferred type and in response, to indicate a compilation error.

6. The non-transitory computer-readable storage medium of claim 1, wherein the program instructions are further executable to implement a runtime environment configured to execute the executable version of the computer program and to determine, during execution of the executable version of the computer program, that the variable is being used in a manner inconsistent with the inferred type and in response, to indicate a runtime error.

7. A method, comprising:
a compiler receiving source code for a computer program;
the compiler determining that the source code includes an assignment context associating a variable with a value, the assignment context having:
  a declaration expression introducing the variable, wherein the declaration expression specifies a part of a type for the variable and does not specify another part of the type for the variable, wherein:
    the type for the variable is a parameterized type;
    the part of the type specified in the declaration expression comprises a ground type; and
    the part of the type not specified in the declaration expression comprises one or more type arguments for the parameterized type; and
  an initialization expression whose evaluation will result in the value, wherein a type of the initialization expression is a parameterized type corresponding to a given ground type and one or more type arguments;
the compiler inferring the type for the variable based at least on the specified part of the type in the parameterized type in the declaration expression and on the parameterized type of the initialization expression, wherein to infer the type for the variable, the compiler:
  identifies a generic type corresponding to the parameterized type of the initialization expression;
  identifies a generic supertype of the identified generic type, wherein the identified generic supertype has the same ground type as a ground type indicated by the part of the type for the variable introduced in the declaration expression; and
  infers a parameterized type for the variable by parameterizing the generic supertype with one or more type arguments of the parameterized type of the initialization expression;
in response to said inferring, the compiler binding the variable to the inferred type; and
the compiler compiling the source code into an executable version of the computer program, wherein the compiling is dependent on the binding of the variable to the inferred type.

8. The method of claim 7, wherein the given ground type for the declaration expression is different than the given ground type for the initialization expression.

9. The method of claim 7, wherein the declaration expression includes an indication of a request for the compiler to infer the type for the variable.

10. The method of claim 7, wherein the assignment context is an assignment expression that includes the declaration expression and the initialization expression.

11. The method of claim 7, further comprising: determining that the variable is being used within the source code in a manner inconsistent with the inferred type and in response, indicating a compilation error.

12. The method of claim 7, further comprising:
a runtime environment executing the executable version of the computer program and determining, during execution of the executable version of the computer program, that the variable is being used in a manner inconsistent with the inferred type and in response, indicating a runtime error.

13. A system, comprising:
one or more processors;
a memory coupled to the one or more processors, wherein the memory stores program instructions executable by the one or more processors to implement:
  a compiler receiving source code for a computer program;
  the compiler determining that the source code includes an assignment context associating a variable with a value, the assignment context having:
    a declaration expression introducing the variable, wherein the declaration expression specifies a part of a type for the variable and does not specify another part of the type for the variable, wherein:
      the type for the variable is a parameterized type;
      the part of the type specified in the declaration expression comprises a ground type;
      the part of the type not specified in the declaration expression comprises one or more type arguments for the parameterized type; and
    an initialization expression whose evaluation will result in the value, wherein a type of the initialization expression is a parameterized type corresponding to a given ground type and one or more type arguments;
  the compiler inferring the type for the variable based at least on the specified part of the type in the parameterized type in the declaration expression and on the parameterized type of the initialization expression, wherein to infer the type for the variable, the compiler:
    identifies a generic type corresponding to the parameterized type of the initialization expression;
    identifies a generic supertype of the identified generic type, wherein the identified generic supertype has the same ground type as a ground type indicated by the part of the type for the variable introduced in the declaration expression; and
    infers a parameterized type for the variable by parameterizing the generic supertype with one or more type arguments of the parameterized type of the initialization expression;
  in response to said inferring, the compiler binding the variable to the inferred type; and the compiler compiling the source code into an executable version of the computer program, wherein the compiling is dependent on the binding of the variable to the inferred type.

14. The system of claim 13, wherein the given ground type for the declaration expression is different than the given ground type for the initialization expression.

15. The system of claim 13, wherein the declaration expression includes an indication of a request for the compiler to infer the type for the variable.

16. The system of claim 13, wherein the assignment context is an assignment expression that includes the declaration expression and the initialization expression.

17. The system of claim 13, wherein the compiler is further configured to determine that the variable is being used within the source code in a manner inconsistent with the inferred type and in response, to indicate a compilation error.

* * * * *

UNITED STATES PATENT AND TRADEMARK OFFICE
CERTIFICATE OF CORRECTION

PATENT NO. : 8,813,049 B2
APPLICATION NO. : 12/827871
DATED : August 19, 2014
INVENTOR(S) : Goetz et al.

Page 1 of 1

It is certified that error appears in the above-identified patent and that said Letters Patent is hereby corrected as shown below:

On title page 2, column 1, References Cited under Other Publications, line 9, delete "Jun." and insert -- Jan. --, therefor.

In the Specification

In column 5, line 10, delete "<,String>" and insert -- <String> --, therefor.

Signed and Sealed this
Tenth Day of March, 2015

Michelle K. Lee
*Deputy Director of the United States Patent and Trademark Office*